(12) United States Patent  
Jager et al.

(10) Patent No.: US 11,878,593 B2  
(45) Date of Patent: Jan. 23, 2024

(54) METHODS AND APPARATUSES FOR REGULATING POWER LEVELS IN CIRCUITS OF ELECTRIC DEVICES

(71) Applicant: ACCELERATED SYSTEMS INC., Waterloo (CA)

(72) Inventors: Willem Jager, Cambridge (CA); Tim Lambert, Los Angeles, CA (US); Peter Mankowski, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 604 days.

(21) Appl. No.: 17/088,742

(22) Filed: Nov. 4, 2020

(65) Prior Publication Data

US 2021/0129676 A1     May 6, 2021

Related U.S. Application Data

(60) Provisional application No. 62/931,241, filed on Nov. 6, 2019.

(51) Int. Cl.
    *B60L 3/04*      (2006.01)
    *B60L 15/20*      (2006.01)
    *B60R 16/023*      (2006.01)
    *G06N 20/00*      (2019.01)
    *B60L 3/00*      (2019.01)

(52) U.S. Cl.
CPC .............. *B60L 3/04* (2013.01); *B60L 3/0069* (2013.01); *B60L 15/20* (2013.01); *B60R 16/0231* (2013.01); *G06N 20/00* (2019.01); *B60L 2250/26* (2013.01); *B60L 2260/44* (2013.01); *B60L 2260/46* (2013.01)

(58) Field of Classification Search
CPC .......... B60L 3/04; B60L 3/0069; B60L 15/20; B60L 2250/26; B60L 2260/44; B60L 2250/46; G06N 20/00; B60R 16/0231
See application file for complete search history.

(56) References Cited

U.S. PATENT DOCUMENTS

| | | |
|---|---|---|
| 7,157,806 B2 | 1/2007 | Jabaji et al. |
| 9,417,677 B2 * | 8/2016 | Gray ........................ G06F 1/28 |
| 2008/0122518 A1 * | 5/2008 | Besser .................... H02J 3/381 |
| | | 327/518 |
| 2008/0151454 A1 | 6/2008 | Uhl |
| 2010/0207571 A1 * | 8/2010 | English .............. H01M 10/486 |
| | | 320/101 |
| 2012/0025752 A1 * | 2/2012 | Teggatz .................... H02J 7/35 |
| | | 320/101 |

(Continued)

*Primary Examiner* — Gertrude Arthur Jeanglaude  
(74) *Attorney, Agent, or Firm* — Nyssa Inc.

(57) ABSTRACT

There is provided a method of operating an electric device. The method includes receiving one or more operating power levels being used by one or more loads on a given circuit of the electric device, and setting a power threshold based on the one or more operating power levels. The method also includes receiving an output power level being delivered to the given circuit by a power source connected to the given circuit, and comparing the output power level with the power threshold. Furthermore, the method includes, if the output power level exceeds the power threshold, reducing the output power level to less than or equal to the power threshold. A related power regulator is also provided.

25 Claims, 4 Drawing Sheets

(56) References Cited

U.S. PATENT DOCUMENTS

| | | | |
|---|---|---|---|
| 2012/0176078 A1* | 7/2012 | English | H01M 10/44 320/101 |
| 2015/0253800 A1* | 9/2015 | Kassayan | H02J 3/00 323/299 |
| 2017/0192445 A1* | 7/2017 | Dennis | G05F 1/67 |

* cited by examiner

100

Receiving one or more operating power levels being used by one or more loads on a given circuit of an electric device

105

Setting a power threshold based on the one or more operating power levels

110

Receiving an output power level being delivered to the given circuit by a power source connected to the given circuit

115

Comparing the output power level with the power threshold

117

If the output power level exceeds the power threshold, reducing the output power level to less than or equal to the power threshold

METHODS AND APPARATUSES FOR REGULATING POWER LEVELS IN CIRCUITS OF ELECTRIC DEVICES

CROSS-REFERENCE TO RELATED APPLICATION

This application claims priority from U.S. Provisional Patent Application No. 62/931,241, filed on Nov. 6, 2019, which is incorporated herein by reference in its entirety.

FIELD

The present specification relates to methods and apparatuses for regulating power, and in particular to methods and apparatuses for regulating power in electric devices.

BACKGROUND

Some powered devices may be powered by electricity. Such devices may be described as electric devices. Electric devices may use electrical energy to perform their functions. Moreover, electric devices may comprise various components electrically connected to one another, to transmit electrical power between those components.

SUMMARY

According to an implementation of the present specification there is provided a method of operating an electric device, the method comprising: receiving one or more operating power levels being used by one or more loads on a given circuit of the electric device; setting a power threshold based on the one or more operating power levels; receiving an output power level being delivered to the given circuit by a power source connected to the given circuit; comparing the output power level with the power threshold; and if the output power level exceeds the power threshold, reducing the output power level to less than or equal to the power threshold.

One or more of: the receiving the one or more operating power levels may comprise receiving the one or more operating power levels at a power regulator of the electric device; the setting the power threshold may comprise setting the power threshold at the power regulator based on the one or more operating power levels; the receiving the output power level may comprise receiving the output power level at the power regulator; the comparing the output power level with the power threshold may comprise comparing the output power level with the power threshold at the power regulator; and the reducing the output power level may comprise the power regulator reducing the output power level to less than or equal to the power threshold.

One or more of: the given circuit may comprise a CAN-BUS; the electric device may comprise an electric vehicle; the power source may comprise a battery; and at least one of the loads may comprise an electric motor.

The setting the power threshold may comprise setting the power threshold to be a sum of the one or more operating power levels.

The method may further comprise: receiving a reference power level associated with a reference demand received in association with the electric device; and wherein: the setting the power threshold may comprise setting the power threshold based on the one or more operating power levels and the reference power level.

The setting the power threshold may comprise setting the power threshold to be the greater of a sum of the operating power levels and the reference power level.

The electric device may comprise an electric vehicle; and the reference demand may be associated with a throttle input received in association with the electric vehicle.

The setting the power threshold may comprise using a trained machine learning model to set the power threshold.

The trained machine learning model may comprise a machine learning model trained using a training dataset associated with one or more comparator electric devices, the training dataset comprising one or more of a comparator operating power level, a comparator power threshold, and a comparator output power level.

The method may further comprise: receiving an operator input in association with the electric device; and wherein: the setting the power threshold may comprise setting the power threshold using the trained machine learning model receiving as inputs the operator input and the operating power levels.

The method may further comprise: receiving an operating mode indicator of the electric device; and wherein: the setting the power threshold may comprise setting the power threshold based on the one or more operating power levels and the operating mode indicator.

The method may further comprise: receiving one or more comparator power thresholds associated with one or more comparator electric devices; and wherein: the setting the power threshold may comprise setting the power threshold based on the one or more operating power levels and the one or more comparator power thresholds.

The method may further comprise: receiving a fault indicator associated with the electric device; and in response, disconnecting from the circuit one of more of the power source and the one or more loads.

According to another implementation of the present specification there is provided a power regulator for an electric device, the power regulator comprising: a memory to store instructions executable by a processor; and the processor in communication with the memory, the processor to: receive one or more operating power levels being used by one or more loads on a given circuit of the electric device; set a power threshold based on the one or more operating power levels; receive an output power level being delivered to the given circuit by a power source connected to the given circuit; compare the output power level with the power threshold; and if the output power level exceeds the power threshold, reduce the output power level to less than or equal to the power threshold.

One or more of: the given circuit may comprise a CAN-BUS; the electric device may comprise an electric vehicle; the power source may comprise a battery; and at least one of the loads may comprise an electric motor.

To set the power threshold the processor may be to set the power threshold to be a sum of the one or more operating power levels.

The processor may be further to: receive a reference power level associated with a reference demand received in association with the electric device; and wherein: to set the power threshold the processor may be to set the power threshold based on the one or more operating power levels and the reference power level.

To set the power threshold the processor may be to set the power threshold to be the greater of a sum of the operating power levels and the reference power level.

The electric device may comprise an electric vehicle; and the reference demand may be associated with a throttle input received in association with the electric vehicle.

To set the power threshold the processor may be to use a trained machine learning model to set the power threshold.

The trained machine learning model may comprise a machine learning model trained using a training dataset associated with one or more comparator electric devices, the training dataset comprising one or more of a comparator operating power level, a comparator power threshold, and a comparator output power level.

In some examples, the electric device may comprise an electric lawnmower, and the trained machine learning model may be trained using comparator operating power levels incorporated in the training dataset. Such comparator operating power levels may be representative of the operating power levels of individual electric lawnmowers. These operating power levels may further be represented by fractional or per-unit values, or they may be represented by absolute measurements of the operating power of those electric lawnmowers. The training dataset may, in this way be comprised of the measurements of the operating power of a plurality of electric lawnmowers. Furthermore, the training dataset may comprise the power thresholds and output power levels of a plurality of electric lawnmowers, wherein those power thresholds may be used as comparator power thresholds, and those output power levels may be used as comparator output power levels.

The processor may be further to: receive an operator input in association with the electric device; and wherein: to set the power threshold the processor may be to: set the power threshold using the trained machine learning model receiving as inputs the operator input and the operating power levels.

The processor may be further to: receive an operating mode indicator of the electric device; and wherein: to set the power threshold the processor may be to set the power threshold based on the one or more operating power levels and the operating mode indicator.

The processor may be further to: receive one or more comparator power thresholds associated with one or more comparator electric devices; and wherein: to set the power threshold the processor may be to set the power threshold based on the one or more operating power levels and the one or more comparator power thresholds.

The processor may be further to: receive a fault indicator associated with the electric device; and in response, disconnect from the circuit one of more of the power source and the one or more loads.

BRIEF DESCRIPTION OF THE DRAWINGS

Some example implementations of the present specification will now be described with reference to the attached Figures, wherein.

DETAILED DESCRIPTION

Unless the context requires otherwise, throughout this specification the word "comprise" and variations thereof, such as, "comprises" and "comprising" are to be construed in an open, inclusive sense, that is as "including, but not limited to."

As used in this specification, the singular forms "a," "an," and "the" include plural referents unless the content clearly dictates otherwise. It should also be noted that the term "or" is generally employed in its broadest sense, that is as meaning "and/or" unless the content clearly dictates otherwise.

Electric devices use electric circuits to deliver power from power sources to the electric loads that perform the functions of those devices. Mobile or portable electric devices may carry their power source on board. Examples of such on-board electrical power sources may include batteries, and the like. Faults or electrical shorts in the circuits may cause excessive amounts of electric power to be output from the batteries or delivered to the loads. Such excessive amounts of power may damage the batteries, the loads, the circuit, or other parts of the electric device.

Some batteries or battery-powered circuits may include a Battery Management System (BMS) to monitor or control the operation of the battery. Some BMSs include predetermined or hard-coded limits for the amount of power that may be output from a given battery. In some examples the BMS samples the amount of power delivered by the battery at a given time interval based on a predetermined clock rate or sampling rate of the BMS. If shorts, power spikes, or other faults occur at a time between successive sampling time points of the BMS, sufficient power may be delivered from the battery and into the circuit to damage the battery, the circuit, or other components connected to the circuit.

Moreover, the predetermined limits of BMSs may be based on safe limits of the operating parameters of the battery including maximum output current or voltage, maximum operating temperature, and the like. In some situations, an undetected short in the circuit may cause the battery to deliver sufficient power within its maximum safe operating limits to cause damage to the circuit or other components of the electric device.

In addition, some devices may have idle, sleep, power off, or storage modes wherein the main loads of the device are deactivated, and the battery is to provide an output power sufficient only to monitor the state of the device and to be able to wake-up or activate the device based on instructions received from an operator of the device. An example of such a device would be an electric vehicle, which may have an idle, ignition off, or storage mode wherein an electric motor of the vehicle is deactivated, but a controller of the vehicle remains powered by the battery to be able to monitor the state of the vehicle and to turn on the vehicle and its motor as demanded by an operator of the vehicle. In such examples, the predetermined power thresholds of the BMS, which are based on the maximum safe operating limits of the battery, may be too high to prevent shorts in the circuit from draining the battery or transferring damaging amounts of power from the battery into other components on the circuit such as the controller, and the like.

Figure 1:
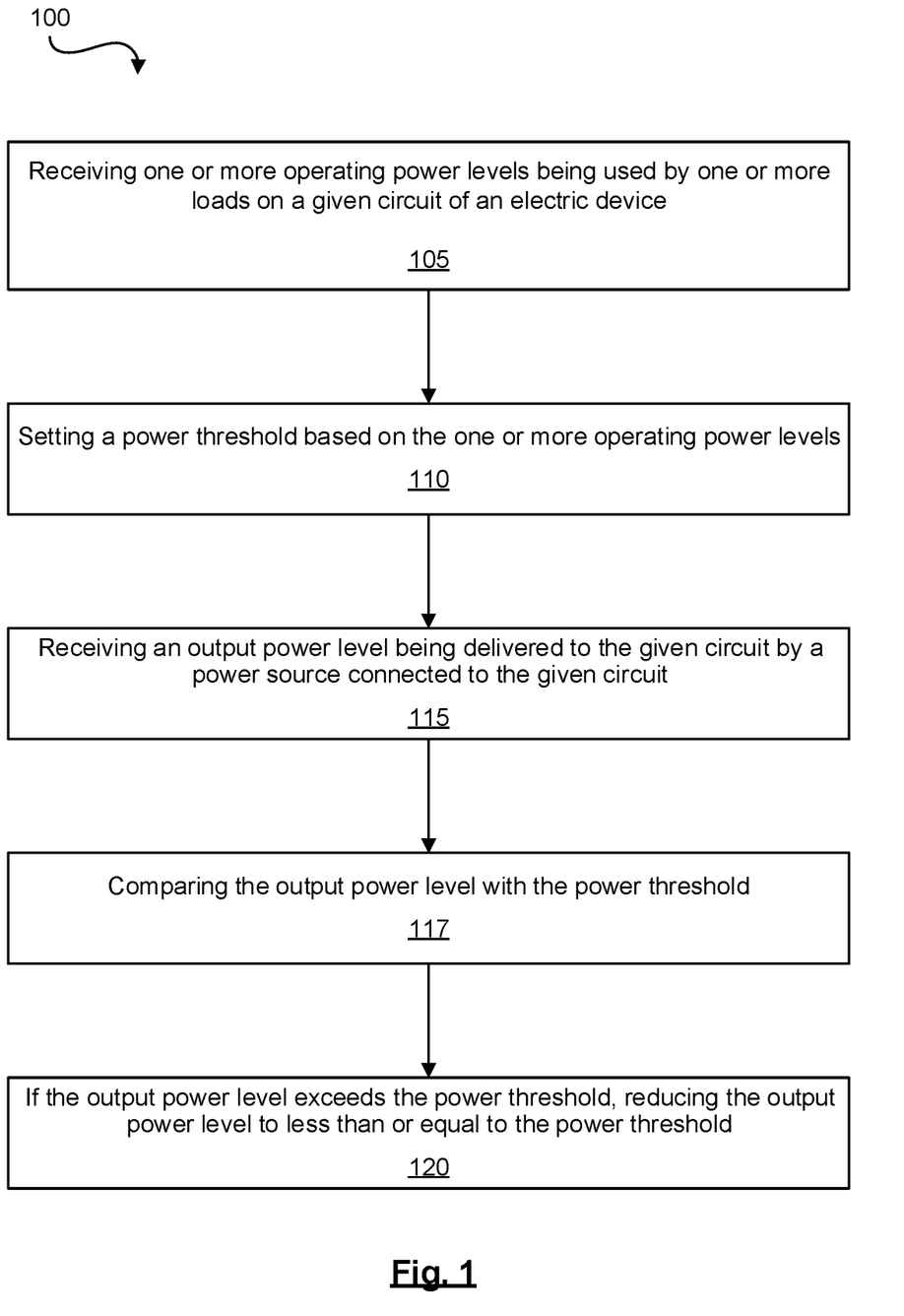
FIG. 1 shows a flowchart of an example method for operating an electric device, in accordance with a non-limiting implementation of the present specification.

FIG. 1 shows a flowchart of an example method 100 for operating an electric device, such as an electric vehicle and the like. Method 100 may be used to set and vary the power thresholds dynamically to protect against damage to power sources, circuits, and the loads of the electric device. At box 105, one or more operating power levels being used by one or more loads on a given circuit of the electric device may be received. In some examples, the electric device may comprise an electric vehicle such as a car, golf cart, bicycle, motorcycle, lawn mower, lift truck, and the like.

Moreover, in some examples, the operating power levels may be received by a power regulator. In some examples, the power regulator may comprise a controller in or connected to the given circuit. The controller may comprise a central or master controller on the circuit, a load-specific controller such as a motor controller, a dedicated power regulating controller, and the like. Furthermore, in some examples the power regulator or its functionality may comprise or be incorporated into the BMS for one or more of the batteries of the electric device. As will be described in greater detail in relation to method 100, such a BMS may have a power threshold that is variable or dynamic based on the operating power levels of the loads on a circuit of the electric device.

In addition, loads may comprise consumers of electric power on a circuit of the electric device. Some examples of loads may include electric motors, heaters, controllers, sensors, processors, actuators, and other electrically-powered components connected to a given circuit of the electric device. The operating power levels of these loads may provide a measure or indication of the amount of power being used during the operation of the electric device. The operating power levels may be determined based on the currents, voltages, or a combination of currents and voltages drawn by each load during the load's operation. In some examples, the operating power level may comprise the actual, real-time power level consumed by the load.

Furthermore, in some examples, receiving the operating power levels may comprise obtaining the operating power levels, measuring the operating power levels, calculating the operating power levels, retrieving the operating power levels from machine-readable storage, and the like. In some examples, the power regulator may measure the operating power level. Moreover, in some examples a controller or other sensor(s) on the circuit may measure or obtain the operating power levels and communicate them to the power regulator. In addition, in some examples each load itself may track its operating power level and report that level back to the power regulator.

It is also contemplated that in some examples the operating power levels may be predicted or otherwise determined using a trained machine learning model or other prediction tools or artificial intelligence (AI)-enabled tools. Such predictions may be based on one or more operating parameters of the electric device such as operator inputs, electric device parameters, environmental parameters, and the like.

It is contemplated that in some examples the circuit may comprise a CAN-BUS, or a similar hardware/software networking protocol, to connect the power sources to the loads. Such a CAN-BUS may allow both operating power and control/information signals to flow between the various components connected to the circuit. In such examples, the loads may send their operating power levels to the power regulator using the CAN-BUS, which CAN-BUS also brings power to the loads from the power source also connected to the circuit. In addition, while most electric devices may comprise multiple loads connected to a circuit, it is contemplated that the methods described herein may also be used in circuits that comprise one load.

At box 110, a power threshold may be set based on the one or more operating power levels. In some examples, the power threshold may be set by the power regulator. Moreover, in some examples setting the power threshold may comprise calculating the sum of the operating power levels being used by the loads and setting the power threshold to be about equal to the sum.

Turning now to box 115, an output power level being delivered to the given circuit by a power source connected to the given circuit may be received. In some examples, the output power level may be received by the power regulator. As discussed above, in some examples the power source may comprise one or more batteries. In some examples, the output power level may reflect or indicate the amount of power being output by the power source connected to the circuit. Furthermore, in some examples the output power level may comprise the amount of power being delivered by the power source into the circuit to which the power source is connected. In some examples, the output power level may be based on the current, voltage, or a combination of current and voltage associated with the output of the power source.

Moreover, in some examples receiving the output power level may comprise obtaining the output power level, measuring the output power level, calculating the output power level, retrieving the output power level from machine-readable storage, and the like. In some examples, the power regulator itself may measure the power output level. Moreover, in some examples a controller or sensor may measure the power output level and report it to the power regulator. In addition, in some examples a BMS associated with the power source may measure the output power level and report it to the power regulator. Furthermore, in some examples each power source itself may measure its output power level, and report this level over the CAN-BUS to the power regulator.

At box 117, the output power level may be compared with the power threshold. In some examples, this comparison may be made at the power regulator. At box 120, the output power level may be reduced to less than or equal to the power threshold if the output power level exceeds the power threshold. In some examples, the power regulator may affect this reduction in the output power level. Moreover, in some examples the output power level may be reduced to a level below the power threshold. As the power threshold is set dynamically based on the operating power levels of the loads, keeping the output power at or below the threshold may allow the amount of power being delivered by the power sources to be subjected to a dynamic threshold and be kept at or below that threshold.

Moreover, in some examples the power regulator may send a control signal to a BMS or other controller associated with the power source, which BMS or controller may then set its power threshold based on the control signal and perform the function of restricting the output power level based on the power threshold.

Furthermore, it is contemplated that in some examples changes in the operating conditions of the device may demand the power source to increase or decrease the output power available to the loads relative to the current operating power level of the loads. In other words, in some examples method 100 may further comprise receiving a reference power level associated with a reference demand received in association with the electric device. In some examples, the reference demand may be received at a power regulator of the electric device. Moreover, in some examples, the reference demand may comprise an input received in association with the electric device, which reference demand is to affect or adjust the operation of the loads. The reference demand may have an associated reference power level. In some examples, for the loads to operate in a manner adjusted according to the reference demand, the aggregate of the operating power levels of the loads would need to approach or become about equal to the reference power level.

In some such examples where a reference demand is received, the power threshold may be set based on the reference power level as well as the operating power levels. As described above, the reference demand may cause a change in the operation of the loads that may cause the operating power levels to approach the reference power level. Taking the reference power level into account when setting the power threshold may allow for the power threshold to be adjusted to accommodate the change in the operation of the loads caused by the reference demand.

Furthermore, in some examples where a reference demand is received, the power threshold may be set to be the greater of the aggregate or sum of the operating power levels and the reference power level. Such an approach to setting the power threshold may allow for the power threshold to be increased if the reference demand changes the operation of the loads to increase the operating power levels. In addition, in some examples, the power threshold may be set to be the lesser of the sum of the operating power levels and the reference power level. Similarly, such an approach to setting the power threshold may allow for the power threshold to be decreased if the reference demand changes the operation of the loads to decrease the operating power levels.

In examples where the electric device comprises an electric vehicle, the reference demand may be associated with a throttle input received in association with the electric vehicle. For example, an operator of the electric vehicle my increase the throttle input, which may cause more power to be directed from the power source to the loads such as the electric motors of the vehicle. In such examples, the excess of the output power level above the operating power level may be checked against external or reference demands for power. If the excess is verified against the external or reference demand, the threshold may then be increased to allow for the increased power to be transferred into the circuit. Once the loads begin operating under this increased operating power, their now-increased operating power level may then set and support a higher power threshold for purposes of method 100.

In some examples, instead of or in addition to using the operating power levels of the loads to set the power threshold, the power regulator may detect an operating mode of the electric device. In some examples, the operating mode may comprise an active mode or an inactive mode such as ignition off, sleep, idle, and the like. Furthermore, in some examples where the electric device comprises an electric vehicle, the active mode may comprise an economy mode, sport mode, performance mode, off-road mode, and the like. Moreover, in some examples, the operating mode may be selected or triggered by an operator of the electric device. In addition, in some examples, the operator may be able to define custom or operator-defined operating modes for the electric device.

In some such examples, method 100 may further comprise receiving an operating mode indicator of the electric device. Moreover, in some examples, the operating mode indicator may be received at the power regulator. The operating mode indicator may indicate the current operating mode of the electric device, or an operating mode which the electric device is to adopt or switch into. In such examples, the power threshold may be set based on the operating power levels as well as the operating mode indicator. For example, an operating mode indicator indicating a sport or performance operating mode may set the power threshold higher than an economy operating mode.

In some examples, in an inactive mode, such as ignition off, sleep, idle, and the like, the power threshold may be set to a predetermined lower limit that is lower than the operating power levels that can be used to actuate motors or other relatively high-power-demand loads such as heaters, and the like. This predetermined lower limit may allow sufficient power into the circuit or controller to allow the controller to detect an ignition on or wake situation, and then allow more power to be delivered from the power source over the circuit to the loads as the device turns on and becomes fully operational. In other words, this limited amount of power may be sufficient to allow the controller to disable the limiting function in the case that the vehicle requires power to turn on or awaken, and operate.

Moreover, in some examples, method 100 may further comprise receiving a power source parameter associated with the power source. In some examples, the power source parameter may be received at the power regulator. Furthermore, in some examples, the power source parameter may comprise the type of the power source, the capabilities of the power source, the age or condition of the power source, and the like. In examples where the power source comprises a battery, the power source parameter may comprise the type of the battery, the chemistry of the battery, the age of the battery, a target lifetime for the battery, and the like. In such examples where a power source parameter is received, the power threshold may be set based on the operating power levels as well as the power source parameter.

For example, if a power source parameter indicates that a battery is relatively older and capable of delivering relatively less power, the power threshold may be set relatively lower to take into account the age and capability of the battery. Furthermore, in some examples the power source parameter may indicate a given target lifetime for the battery. In such examples, the power threshold may be set or adjusted to increase the likelihood of the battery having an operational lifetime approaching the given target lifetime.

In some examples, method 100 may further comprise receiving one or more comparator power thresholds associated with one or more comparator electric devices. Comparator electric devices may comprise electric devices that are sufficiently similar in structure or function to the target electric device running method 100 such that the comparator power thresholds associated with the comparator electric devices may be used as relevant comparables or comparators for setting the power threshold of the target electric device. For example, if a fleet of 1,000 identical or similar electric golf carts are in operation, comparator power thresholds of other members of the fleet may be taken into account when setting the power threshold for a given or target golf cart within the fleet. In such examples, the power threshold may be set based on the operating power levels as well as the comparator power thresholds. In this manner, various members of the fleet may learn from one another when setting their individual power thresholds under various operating conditions.

Furthermore, in some examples, a trained machine learning model may be used to set the power threshold. Moreover, in some examples, this machine learning model may be run or implemented by the power regulator. In some examples, the machine learning model may comprise neural networks, support vector machines using linear- or kernel-based classifiers, evolutionary/genetic/swarm algorithms, and the like. Furthermore, the machine learning model may use supervised or unsupervised learning methods. In addition, in some examples, the machine learning model may be trained using a training dataset associated with one or more comparator electric devices. This training dataset may comprise one or more of comparator operating power levels, comparator power thresholds, and comparator output power levels. In this manner, the machine learning model may be used to learn from historical or past operating data (e.g. operating power levels, power thresholds, output power levels, and the like) of the target electric device, or from operating data of comparator electric devices.

Using a trained machine learning model, the power threshold may be predicted or otherwise generated based on the operating parameters such as the operating power levels. It is also contemplated that in some examples, other types of operating parameters may be used as the inputs of the machine learning model in order to generate the power threshold. Examples of such other operating parameters may include operator input, reference demand, sensor data, environmental data, vehicle data, and the like. Examples of operator input may include control commands, operating mode selection, throttle input, and the like. Examples of sensors may include an accelerometer, gyroscope, incline detector, speedometer, thermometer, and the like. Examples of environmental data may include terrain type and condition, temperature, and the like. Furthermore, examples of vehicle data may include vehicle weight, condition, age, and the like.

A trained machine learning model may also be used to learn or predict likely or anticipated power use or drain levels in an inactive mode such as ignition off, sleep, or idle conditions. In this manner, if the actual operating power levels exceed the power use or drain levels predicted by the machine learning model, a notification or alert may be generated indicating the abnormal power use. In some examples, upon detection of such an abnormal power use, one or more loads or power sources on the circuit associated with the unexpected power use may be restricted or disconnected from the circuit to reduce the likelihood of damage to the components of the circuit or the electric device.

In some examples, the machine learning model may comprise a support vector machine which is applied to identify the appropriate power threshold for the electric device, and to recognize anomalies in the operating power of the same electric device. In such an example, the support vector machine may comprise a sufficient definition of a multidimensional hyperplane, based on the available information in the controller for the electric device. This hyperplane may comprise a boundary between the normal or expected operating power levels, and the abnormal or unexpected operating power levels of the electric device. As a result, a power regulator comprising such a machine learning model may be able to identify an abnormal vehicle condition more accurately when compared to a power regulator comprising traditional methods of setting the power threshold.

Moreover, in some examples, the machine learning model may comprise a generative adversarial network which is applied to recognize faults occurring in the vehicle when it is in an inactive state. In such an embodiment, the generative adversarial network may comprise one network which is trained to generate fault signatures, and another network which is trained to recognize fault signatures, wherein a fault signature may comprise a plurality of signals which are available as inputs to the machine learning model. The generative adversarial network may then learn using information from both comparator electric devices and the electric device on which the machine learning model is present, and may reach an equilibrium in which the generation and recognition of fault signatures are balanced, such that the generative adversarial network is able to both recognize faults, and self-test for its ability to recognize those faults. This is advantageous in situations where components of the electric device or signals available to the power regulator may become compromised or unavailable, such as in an electric device which has remained in storage beyond the duration of a manufacturer warranty.

In addition, in some examples the power source may comprise multiple individual power source components. For example, a battery pack power source may comprise multiple battery cells or batteries packaged together. In such examples, the combined output power level of the multiple power source components may be received and compared against the power threshold. Moreover, in some examples the reduction of the output power level may be applied to some or all of the individual power source components. In some examples, the reduction may be based on the optimal output power levels for each of the power source components. Furthermore, in some examples the reduction may be based on the operating parameters of each of the power source components such as their charge level, temperature, operating current or voltage, age, type (e.g. battery type), and the like.

Moreover, in some examples, upon reaching box 120, method 100 may move back to box 105, and iterate boxes 105, 110, 115, 117, and 120 one or more times. In some examples, the iterations may be on a predetermined schedule based on the refresh rate or sampling rate of the power regulator implementing method 100. In some examples, additional factors may affect when or how frequently method 100 is iterated. In operating situations where the operating power levels are high or there is a high degree of variability in the operating power levels, method 100 may be iterated more frequently. In operating situations where the operating power levels are relatively low or there is low variability in the operating power levels, such as in idle, ignition off, sleep, or storage modes, method 100 may be iterated relatively less frequently.

Iterating method 100 may allow for changes in the operating power levels to update the power threshold, which in turn would allow the power sources to deliver sufficient output power to meet the operating power needs of the loads.

In addition, in some examples, method 100 and the other methods described herein may be implemented by a power regulator that is outside of or separate from the central controller or a motor controller of the device. This separation may allow the power regulator to detect faults in the controller, which faults may tend to allow excessive or damaging amounts of power to be output from the power source onto the circuit and its loads. For example, if the controller is instructing the power source to provide power to the loads in excess of their operating power levels, and the excess is not verified against an external operating demand or reference, the power regulator may flag the flow of excess power as being due to a fault in the controller and enforce the power threshold based on the current operating power levels of the loads.

In some examples, method 100 may further comprise receiving a fault indicator associated with the electric device. In some examples, the fault indicator may be received at the power regulator. The fault indicator may be associated with different components of the electric device such the loads, the power source, the circuit, a controller, and the like. In some examples where a fault indicator is received, one or more of the power source and one or more of the loads may be disconnected from the circuit in response to the fault indicator. This disconnection, in turn, may reduce the likelihood of damage to the components of the circuit or the electric device.

For example, instead of or in addition to limiting the output power delivered into the circuit from the power source, the power regulator may cut off a faulty load from the circuit, or limit the power going to that faulty load. In some examples, a faulty load may comprise a load that demands or draws an excessive level of operating power. In some examples, a faulty load may have an internal short circuit or other electrical, software, or mechanical damage. Furthermore, in some examples the operating power level of a load may be characterized as excessive by comparing the operating power level against thresholds, external references, or the level of operating power that is to be demanded by the load under non-faulty operation. In such examples, the power regulator may regulate the amount of power demanded or drawn by the loads on the circuit, in addition to or instead of regulating the power transferred by the power source into the circuit.

In some examples, the power regulator may use digital electrical signals, analogue electrical signals, or a combination of both digital and analogue signals to perform the functions described in relation to method 100 and the other methods described herein. In some examples, the power regulator may receive digital electrical signals via the CAN-BUS from the other components on the circuit. For example, such signals may provide the power regulator with the operating power levels and the output power level. The power regulator may also send digital electrical signals via the CAN-BUS to the other components on the circuit. For example, the power regulator may use such a digital signal to send the power threshold to other components on the circuits such as a BMS, which other components may then enforce the power threshold by reducing output power levels that exceed the power threshold.

The power regulator may also send analogue electrical signals to the other components on the circuit. In some examples, such an analogue signal may be sent to a BMS to allow a level of output power up to the power threshold to flow out of the power source. In some examples, such an analogue signal must persist for the power source to be allowed to provide to the circuit the level of output power that is needed to operate the high-power loads of the device, such as the electric motors of an electric vehicle.

Figure 2:
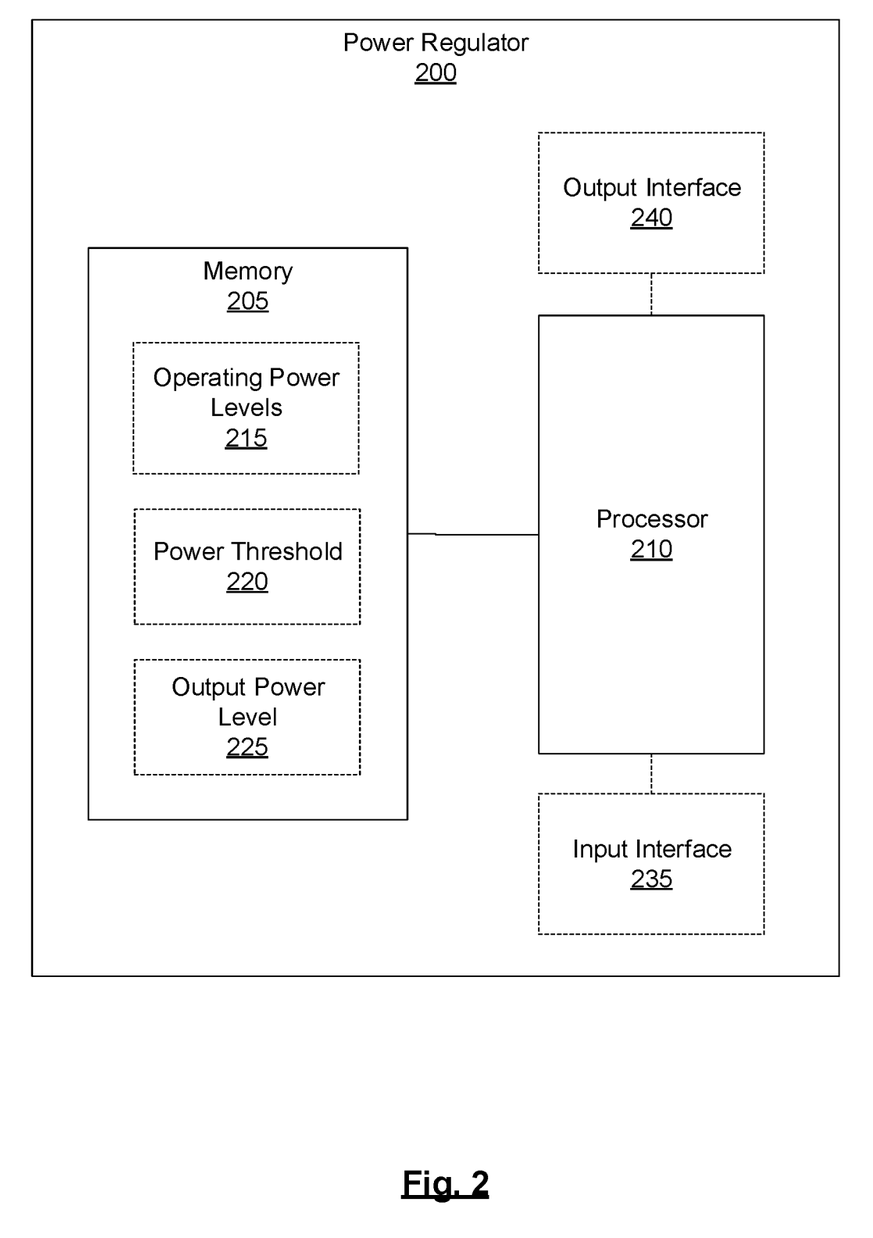
FIG. 2 shows a schematic representation of an example power regulator which may be used to operate an electric device, in accordance with a non-limiting implementation of the present specification.

Turning now to FIG. 2, a schematic representation is shown of an example power regulator 200. Power regulator 200 may also be referred to as "regulator 200" in short. In some examples regulator 200 may be used to operate an electric device, such as an electric vehicle and the like. Regulator 200 may set and vary the power thresholds dynamically to protect against damage to power sources, circuits, and the loads of the electric device. In some examples regulator 200 may be a free-standing component. Moreover, in some examples, regulator 200 or its functionality may be incorporated into different components of the electric device such as a universal or circuit controller, a motor controller, a BMS, and the like.

Regulator 200 comprises a memory 205 to store instructions executable by a processor. Regulator 200 also comprises a processor 210 in communication with memory 205. Regulator 200 may have the features and perform the functions described in relation to method 100 and the other methods described herein.

Processor 210 may comprise a central processing unit (CPU), a graphics processing unit (GPU), a microcontroller, a microprocessor, a processing core, a field-programmable gate array (FPGA), or similar device capable of executing instructions. In some examples, processor 210 may comprise a virtual or virtualized processor, a distributed computing processor, a cloud-based processor, and the like. Processor 210 may cooperate with memory 205 to execute instructions.

Memory 205 may comprise a non-transitory machine-readable storage medium which may comprise an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

In some examples, memory 205 may store one or more of operating power levels 215, a power threshold 220, and an output power level 225. In FIG. 2 operating power levels 215, power threshold 220, and output power level 225 are shown in dashed lines to indicate that in some examples one or more of these entities need not be stored in memory 205. In some examples, the entities not stored in memory 205 may be stored elsewhere in regulator 200, or outside of regulator 200. Moreover, in some examples one or more of the entities not stored in memory 205 may be stored in transitory machine-readable memory as-needed during the operation of regulator 200.

In addition, in some examples regulator 200 may comprise an input interface 235. In some examples, regulator 200 may receive via input interface 235 operating power levels 215 of the various loads connected to a given circuit of the electric device and the output power level 225 of the power source connected to the circuit. Moreover, in some examples operating power levels 215 may be stored separately in memory 205, with each operating power level being associated with a corresponding load and a corresponding time when that operating power level was measured or obtained. Furthermore, in some examples, memory 205 may store one aggregate value being the sum of the operating power levels of the various loads on the circuit, at a given time.

Regulator 200 may also receive via input interface 235 control inputs from a user of the device, such as an operator of an electric vehicle and the like. Such control inputs may include external or reference operating input, such as throttle levels and the like. Moreover, in some examples, regulator 200 may receive via input interface 235 input from sensors such as a current sensor, a voltage sensor, a power sensor, and the like. Moreover, in some examples input interface 235 may receive electrical signals via the CAN-BUS to which regulator 200 is connected. In some examples, these signals may comprise digital electrical signals.

In FIG. 2 input interface 235 is depicted in dashed lines to signify that in some examples regulator 200 need not comprise an input interface. In such examples the functions of the input interface may be performed by a different component of regulator 200 or by an apparatus or system other than regulator 200.

Moreover, in some examples regulator 200 may also comprise an output interface 240. In some examples, regulator 200 may communicate via output interface 240 with the other components on the circuit including loads, power sources, other controllers, and the like. For example, regulator 200 may send, via output interface 240, digital signals to communicate power threshold 220 to other components on the CAN-BUS circuit. Regulator 200 may also send, via output interface 240, analogue signals to operate or open interrupt devices on BMSs or other power source controllers to control or limit the level of output power delivered by the power sources to the circuit.

In addition, in some examples, output interface 240 may output other types of control signals or information. For example, it is contemplated that in some examples regulator 200 may display or otherwise provide information to a user of the electric device, such as an operator of an electric vehicle and the like. The information may be related to the settings or the operating parameters of the vehicle.

In FIG. 2 output interface 240 is depicted in dashed lines to signify that in some examples regulator 200 need not comprise an output interface. In such examples the functions of the output interface may be performed by a different component of regulator 200 or by an apparatus or system other than regulator 200.

It is also contemplated that in some examples regulator 200 may comprise a housing (not shown) to which memory 205 and processor 210 may be directly or indirectly secured. In addition, in some examples input and output interfaces 235, 240 may also be secured to the housing.

In some examples, processor 210 may receive one or more operating power levels 215 being used by one or more loads on a given circuit of the electric device. Processor 210 may then set power threshold 220 based on the one or more operating power levels 215. Moreover, processor 210 may receive output power level 225 being delivered to the given circuit by a power source connected to the given circuit. Processor 210 may then compare output power level 225 with power threshold 220. If output power level 225 exceeds power threshold 220, processor 210 may reduce output power level 225 to less than or equal to power threshold 220.

It is contemplated that in some examples regulator 200 may directly reduce the output power level by controlling how much power is being output from the power source. Furthermore, in some examples regulator 200 may indirectly reduce the output power level by sending control signals to a BMS or other power source controller to dynamically set the power threshold for that BMS or power source controller. The BMS or power source controller, in turn, may adjust the output power level to be at or below the power threshold set by regulator 200.

Regulator 200 may also have the features and perform the functions described in relation to method 100 and the other methods and power regulators described herein. For example, processor 210 may set power threshold 220 to be the sum of the one or more operating power levels 215. Furthermore, in some examples, processor 210 may receive a reference power level associated with a reference demand received in association with the electric device. In some examples, the electric device may comprise an electric vehicle and the reference demand may be associated with a throttle input received in association with the electric vehicle.

Processor 210 may then set power threshold 220 based on the one or more operating levels 215 and the reference power level. Moreover, in some examples, processor 210 may set power threshold 220 to be the greater of the sum of operating power levels 215 and the reference power level. In addition, in some examples, processor 210 may set power threshold 220 to be the lesser of the sum of operating power levels 215 and the reference power level.

In some examples, processor 210 may also receive an operating mode indicator of the electric device, and set power threshold 220 based on the one or more operating power levels 215 and the operating mode indicator. Furthermore, in some examples, processor 210 may receive a power source parameter associated with the power source, and set power threshold 220 based on operating power levels 215 and the power source parameter. Moreover, in some examples, processor 210 may receive one or more comparator power thresholds associated with one or more comparator electric devices, and set power threshold 220 based on operating power levels 215 and the one or more comparator power thresholds.

In addition, in some examples, processor 210 may receive a fault indicator associated with the electric device, and in response, disconnect from the circuit one or more of the power source and the one or more loads.

In some examples, processor 210 may use a trained machine learning model to set power threshold 220. In some such examples, the trained machine learning model may comprise a machine learning model trained using a training dataset associated with one or more comparator electric devices. The training dataset may comprise one or more of comparator operating power levels, comparator power thresholds, and comparator output power levels. Furthermore, in some examples, processor 210 may receive an operator input in association with the electric device, and set power threshold 220 based on operating power levels 215 and the operator input.

Figure 3:
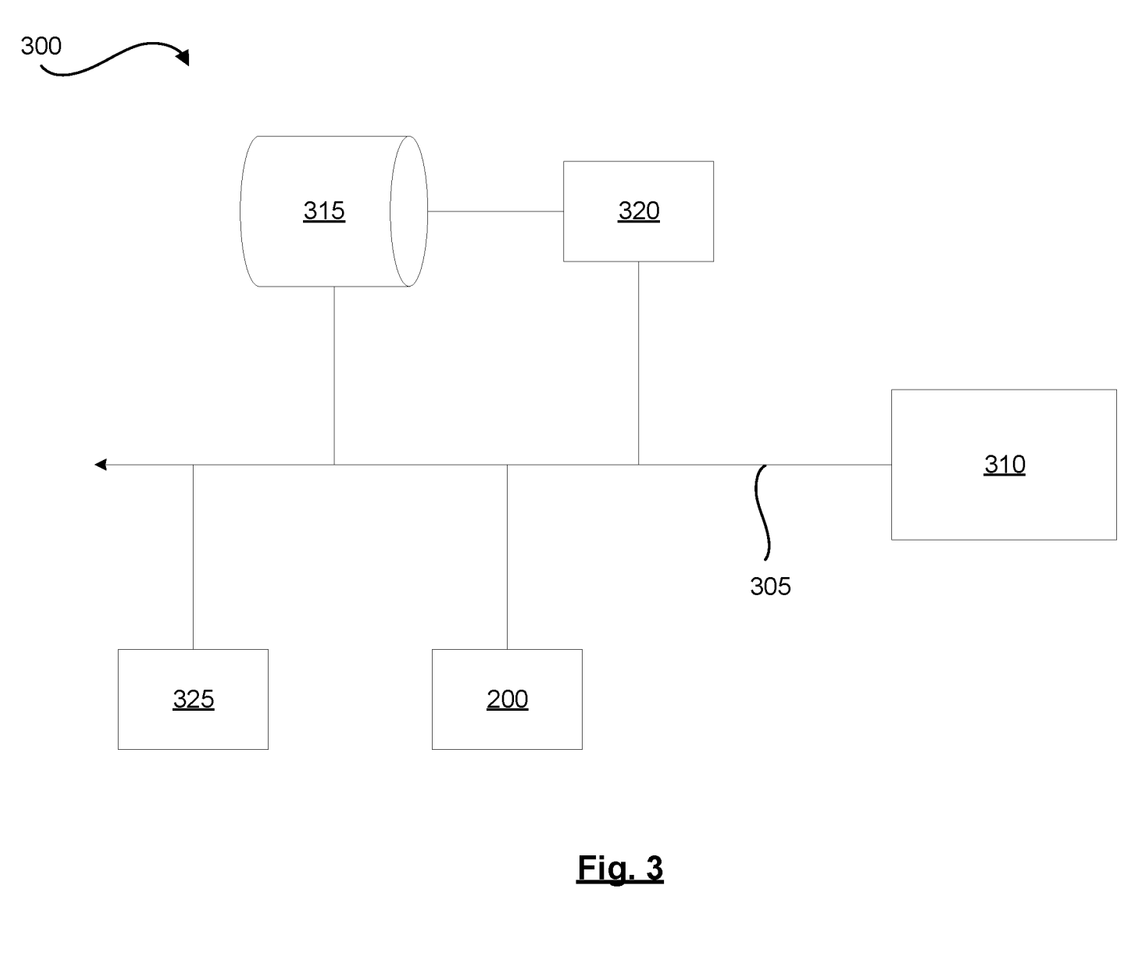
FIG. 3 shows a schematic representation of an example circuit of an example electric device, in accordance with a non-limiting implementation of the present specification.

FIG. 3 shows a schematic representation of an example circuit 300 of an example electric device. Circuit 300 may comprise CAN-BUS 305 to connect power source 310 to the loads on the circuit. In some examples, power source 310 may comprise a battery, and the like. Power regulator 200 may also be part of circuit 300. In addition, circuit 300 may also comprise an electric motor 315 and a motor controller 320. Furthermore, circuit 300 may comprise a wireless communication interface 325. Motor 315 may use higher operating power levels than regulator 200, controller 320, and communication interface 325. As such, motor 315 may be described as a relatively higher-power-demand load and regulator 200, controller 320, and communication interface 325 may be described as relatively low-power-demand loads. It is contemplated that in some examples circuit 300 may comprise types or numbers of loads or power sources different than those shown in FIG. 3.

Regulator 200 may receive operating power levels from motor 315, controller 320, and interface 325. In some examples, regulator 200 may also consider or receive its own operating power level. Moreover, in some examples regulator 200 may also receive an operating power level from the power sources in cases where the power source comprises an integrated BMS or other power-consuming components. Regulator 200 may then set a power threshold based on the operating power levels. In some examples, regulator 200 may set the power threshold to be the sum of the operating power levels of the loads on circuit 300.

Regulator 200 may also receive an output power level being delivered to circuit 300 by power source 310. If the output power level exceeds the power threshold, regulator 200 may reduce the output power level to be about at or below the power threshold.

Figure 4:
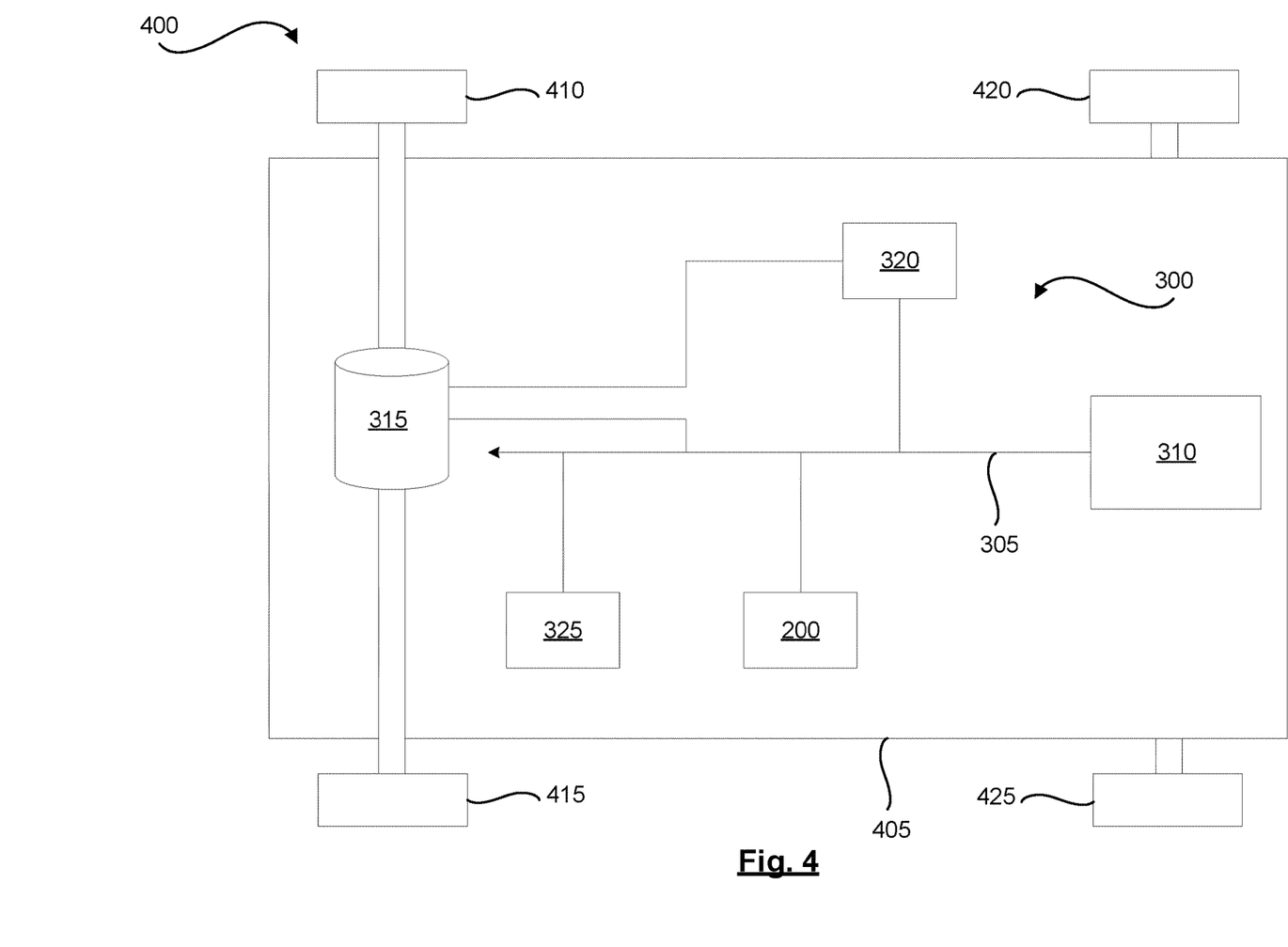
FIG. 4 shows a schematic representation of an example electric vehicle, in accordance with a non-limiting implementation of the present specification.

Turning now to FIG. 4, a schematic representation is shown of an example electric vehicle 400, which includes example circuit 300. Vehicle 400 comprises a chassis 405 and wheels 410, 415, 420, and 425. Motor 315 may be mechanically coupled to wheels 410 and 415 to power those wheels to move or drive vehicle 400. When vehicle 400 is in idle, sleep, or ignition off mode, regulator 200 may reduce the power threshold to a level that is below what would be needed to operate motor 315, but which reduced level may be sufficient to continue powering regulator 200 and interface 325. If a wireless signal or other type of input is receive indicating that vehicle 400 is to transition into awake, active, or operational mode, interface 325 may receive such a signal, and regulator 200 may allow for an increased power threshold so that power source 310 may send to motor 315 the higher operating power levels needed to operate motor 315 to move vehicle 400.

It is contemplated that method 100 and the other methods described herein may be performed by regulator 200, and the other regulators, controllers, and BMSs described herein. In addition, it is contemplated that method 100 and the other methods described herein may also be performed by apparatuses and systems other than the regulators, controllers, and BMSs described herein. Furthermore, it is contemplated that regulator 200 and the other regulators described herein may perform method 100 and the other methods and functions described herein. It is also contemplated that regulator 200 and the other controllers described herein may have features or perform functions other than those described in relation to method 100 and the other methods described herein.

It is also contemplated that in some examples, method 100 and the other methods described herein may be stored in non-transitory computer-readable storage media as machine-readable or computer-readable instructions. Such instructions, upon execution by a processor, may cause the processor to perform method 100 and the other methods described herein.

It should be recognized that features and aspects of the various examples provided herein may be combined into further examples that also fall within the scope of the present disclosure.

The invention claimed is:

1. A method of operating an electric device, the method comprising:
   receiving one or more operating power levels being used by one or more loads on a given circuit of the electric device;
   setting a power threshold based on the one or more operating power levels;
   receiving an output power level being delivered to the given circuit by a power source connected to the given circuit;
   comparing the output power level with the power threshold to determine whether the output power level exceeds the power threshold; and
   reducing the output power level to less than or equal to the power threshold when the output power level exceeds the power threshold.

2. The method of claim 1, wherein one or more of:
   the receiving the one or more operating power levels comprises receiving the one or more operating power levels at a power regulator of the electric device;
   the setting the power threshold comprises setting the power threshold at the power regulator based on the one or more operating power levels;
   the receiving the output power level comprises receiving the output power level at the power regulator;
   the comparing the output power level with the power threshold comprises comparing the output power level with the power threshold at the power regulator; and
   the reducing the output power level comprises the power regulator reducing the output power level to less than or equal to the power threshold.

3. The method of claim 1, wherein one or more of:
   the given circuit comprises a CAN-BUS;
   the electric device comprises an electric vehicle;
   the power source comprises a battery; and
   at least one of the loads comprises an electric motor.

4. The method of claim 1, wherein the setting the power threshold comprises setting the power threshold to be a sum of the one or more operating power levels.

5. The method of claim 1, further comprising:
   receiving a reference power level associated with a reference demand received in association with the electric device; and
   wherein:
   the setting the power threshold comprises setting the power threshold based on the one or more operating power levels and the reference power level.

6. The method of claim 5, wherein the setting the power threshold comprises setting the power threshold to be the greater of a sum of the operating power levels and the reference power level.

7. The method of claim 5, wherein:
   the electric device comprises an electric vehicle; and
   the reference demand is associated with a throttle input received in association with the electric vehicle.

8. The method of claim 1, wherein the setting the power threshold comprises using a trained machine learning model to set the power threshold.

9. The method of claim 8, wherein the trained machine learning model comprises a machine learning model trained using a training dataset associated with one or more comparator electric devices, the training dataset comprising one or more of a comparator operating power level, a comparator power threshold, and a comparator output power level.

10. The method of claim 8, further comprising:
    receiving an operator input in association with the electric device; and
    wherein:
    the setting the power threshold comprises setting the power threshold using the trained machine learning model receiving as inputs the operator input and the operating power levels.

11. The method of claim 1, further comprising:
    receiving an operating mode indicator of the electric device; and
    wherein:
    the setting the power threshold comprises setting the power threshold based on the one or more operating power levels and the operating mode indicator.

12. The method of claim 1, further comprising:
    receiving one or more comparator power thresholds associated with one or more comparator electric devices; and
    wherein:
    the setting the power threshold comprises setting the power threshold based on the one or more operating power levels and the one or more comparator power thresholds.

13. The method of claim 1, further comprising:
    receiving a fault indicator associated with the electric device; and
    in response, disconnecting from the circuit one of more of the power source and the one or more loads.

14. A power regulator for an electric device, the power regulator comprising:

a memory to store instructions executable by a processor; and the processor in communication with the memory, the processor to:
- receive one or more operating power levels being used by one or more loads on a given circuit of the electric device;
- set a power threshold based on the one or more operating power levels;
- receive an output power level being delivered to the given circuit by a power source connected to the given circuit;
- compare the output power level with the power threshold to determine whether the output power level exceeds the power threshold; and
- reduce the output power level to less than or equal to the power threshold when the output power level exceeds the power threshold.

15. The power regulator of claim 14, wherein one or more of:
- the given circuit comprises a CAN-BUS;
- the electric device comprises an electric vehicle;
- the power source comprises a battery; and
- at least one of the loads comprises an electric motor.

16. The power regulator of claim 14, wherein to set the power threshold the processor is to set the power threshold to be a sum of the one or more operating power levels.

17. The power regulator of claim 14, wherein the processor is further to:
- receive a reference power level associated with a reference demand received in association with the electric device; and wherein:
- to set the power threshold the processor is to set the power threshold based on the one or more operating power levels and the reference power level.

18. The power regulator of claim 17, wherein to set the power threshold the processor is to set the power threshold to be the greater of a sum of the operating power levels and the reference power level.

19. The power regulator of claim 17, wherein:
- the electric device comprises an electric vehicle; and
- the reference demand is associated with a throttle input received in association with the electric vehicle.

20. The power regulator of claim 14, wherein to set the power threshold the processor is to use a trained machine learning model to set the power threshold.

21. The power regulator of claim 20, wherein the trained machine learning model comprises a machine learning model trained using a training dataset associated with one or more comparator electric devices, the training dataset comprising one or more of a comparator operating power level, a comparator power threshold, and a comparator output power level.

22. The power regulator of claim 20, wherein the processor is further to:
- receive an operator input in association with the electric device; and wherein to set the power threshold the processor is to:
- set the power threshold using the trained machine learning model receiving as inputs the operator input and the operating power levels.

23. The power regulator of claim 14, wherein the processor is further to:
- receive an operating mode indicator of the electric device; and wherein:
- to set the power threshold the processor is to set the power threshold based on the one or more operating power levels and the operating mode indicator.

24. The power regulator of claim 14, wherein the processor is further to:
- receive one or more comparator power thresholds associated with one or more comparator electric devices; and wherein:
- to set the power threshold the processor is to set the power threshold based on the one or more operating power levels and the one or more comparator power thresholds.

25. The power regulator of claim 14, wherein the processor is further to:
- receive a fault indicator associated with the electric device; and
- in response, disconnect from the circuit one of more of the power source and the one or more loads.

* * * * *